Jan. 17, 1967     J. L. VIECELI     3,298,119
ELECTRIC PRESSING IRON WATER LEVEL GAUGE
Filed Oct. 21, 1965
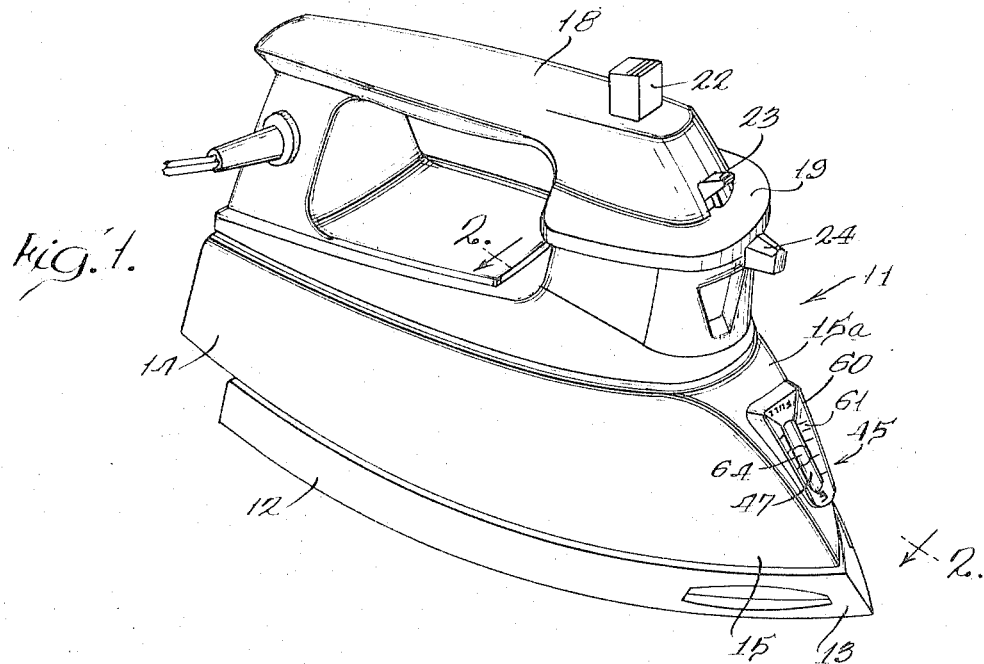
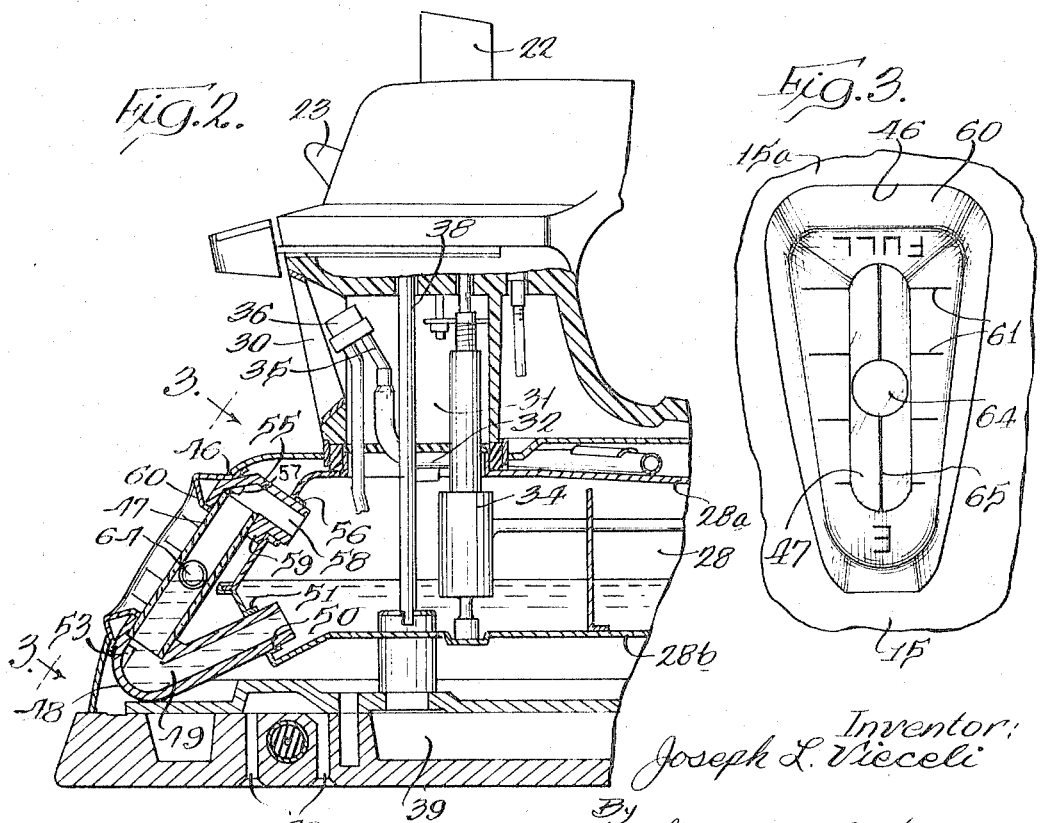
Inventor:
Joseph L. Vieceli
By George R. Clark
Atty United States Patent Office 3,298,119
Patented Jan. 17, 1967

3,298,119
ELECTRIC PRESSING IRON WATER
LEVEL GAUGE
Joseph L. Vieceli, La Grange, Ill., assignor to Sunbeam
Corporation, Chicago, Ill., a corporation of Illinois
Filed Oct. 21, 1965, Ser. No. 500,095
12 Claims. (Cl. 38—77)

This invention relates to electric pressing irons and more particularly to improvements in water level gauges for the water reservoirs in steam irons.

Currently, electric pressing irons employing a steaming or both steaming and spraying systems are enjoying considerable commercial success. Irons of these types are provided with water reservoirs or tanks disposed therein in order to afford ample water for both the water spraying and steaming operations. Since the overall size of the iron cannot be materially increased without interfering with the ease of manipulation and increasing the weight thereof, the size of the water tank is limited and it occasionally needs to be refilled during operation. However, it is undesirable to have the supply of water in the tank exhausted unexpectedly during ironing. Therefore, it is a common practice to provide a sight gauge for indicating the amount of water in the iron reservoir to prevent the water supply from being unexpectedly exhausted. In order for the water level gauge to be most effective, it is desirable that the gauge be positioned so that it may be conveniently read while the iron is used and that the parts of the iron and the hand of the user are not in the user's line of sight when viewing the gauge. Thus, the water level gauge should be located so that it may be read while the iron is in its normal horizontal ironing position and the gauge should be located in the area where the user is normally directing his attention while ironing.

Therefore, an object of the present invention is to provide an electric iron with a water level gauge for indicating the amount of water contained within an iron reservoir and the gauge positioned so that it may be read conveniently while the iron is in the horizontal ironing position.

Another object of the present invention is to provide an electric iron having a water level gauge for determining the amount of water contained within an iron water reservoir while the iron is in the horizontal ironing position and the gauge disposed at the forward portion of the iron where it is readily visible.

Still another object of the present invention is to provide an electric iron with a water gauge which is in close proximity to the iron control members so that the user may view both the iron control members and gauge at the same time.

A further object of the present invention is to provide an iron with a water level gauge located within a shell member having a pointed nose portion at the forward end of the iron and a water level gauge disposed in the shell nose portion.

A still further object of the present invention is to provide an electric iron having a water reservoir with a water level gauge which is visible from above to indicate the quantity of water in the reservoir while the iron is in the horizontal ironing position.

Further objects and advantages of the present invention will become apparent as the following description proceeds, and the features of novelty which characterize the invention will be pointed out with particularity in the claims annexed and forming a part of this specification.

For a better understanding of the present invention, reference may be had to the accompanying drawings in which:

FIG. 1 is a perspective view of an electric iron showing one form of an improved water level gauge arranged in accordance with the invention;

FIG. 2 is an enlarged fragmentary sectional view taken substantially along line 2—2 of FIGURE 1; and FIG. 3 is an enlarged fragmentary view of the water level gauge taken along line 3—3 of FIGURE 2.

Briefly, the present invention is concerned with an electric iron having a water reservoir disposed therein, and an outside surface of the iron which is generally inclined upwardly and which defines an upwardly extending opening. A water level gauge is operatively associated with the reservoir and extends upwardly so that it is visible through the surface opening, whereby the water level gauge indicates to the user the amount of water within the reservoir while the iron is in the horizontal ironing position.

Referring to the drawings in which like numerals designate like parts throughout the several views, a spray steam iron is designated generally by the reference numeral 11. The iron disclosed in the drawing has a separate water spray and steam system and, consequently, requires provision for an ample supply of water in order to meet the demands of the two systems. The particular spray and steam systems partially disclosed herein do not form a part of the present invention and, consequently, are not discussed in detail. However, their construction is disclosed in detail in copending application Serial Number 299,750, filed August 5, 1963, on the construction of the soleplate assembly, which is assigned to the same assignee as the present invention and application Serial Number 203,500 filed June 19, 1962, disclosing the water spray and steam systems, which is assigned to the same assignee as the present application.

The spray steam iron 11 includes a soleplate assembly 12 having a pointed portion 13 located at the forward end of the iron, and an overlying inverted cup-shaped shell 14 formed with a pointed nose portion 15. Resting on the upper portion of shell 14 is a loop-shaped handle 18, including a forward upright section 19 bearing the iron operating controls which comprise a spray button 22, steam control lever 23 and pivotally mounted thermostat temperature setting lever 24. It will be appreciated that the iron controls are all easily visible to the user and are easily actuated while the iron is in operation. FIGURE 1 discloses the spray steam iron 11 in its normal horizontal ironing position.

Located within shell 14 is a water reservoir or tank 28 which is secured to the soleplate 12. In this particular embodiment, the reservoir 28 is fabricated from two stainless steel sections 28a and 28b. In order to fill tank 28 with water, the upright forward handle portion 19 defines an inlet opening 30 which leads into a hollow passageway 31 which, in turn, leads to reservoir opening 32 formed in the top of the upper reservoir section 28a. When spray button 22 is depressed, pump 34 located in the reservoir 28 forces water through conduit 35 into a system which causes water to be sprayed through nozzle 36 positioned in front of handle inlet opening 30. Therefore, when spray button 22 is depressed, water under pressure is fed into nozzle 36 and emerges through inlet opening 30 directed downwardly in front of the soleplate pointed portion 13. Consequently, with each depression of button 22, a given amount of water is depleted from reservoir 28.

When steam is required during the ironing operation, steam knob 23 is moved to the "on" position which shifts rod 38 so that water from the tank 28 is allowed to flow by gravity into steam generating chamber 39, where it is converted into steam and eventually emerges through a plurality of apertures 40 located through the bottom of soleplate 12. Frequently, when the iron is being used, steam will be emerging from the bottom of the soleplate while spray is egressing from the nozzle 36, causing a relatively rapid depletion of the supply of water in reservoir 28.

In accordance with the present invention, a water level sight gauge, generally referred to by reference numeral 45, is provided so that the user may be forewarned concerning the quantity of water in the reservoir and the operation of either or both of the spray or steam features will not be unexpectedly terminated due to the depletion of the water supply within the reservoir 28. The shell nose portion 15 includes an upwardly inclined forward wall 15a which extends from near the soleplate pointed portion 13 towards the handle 18. The nose wall 15a is formed with an elongated opening 46 which extends upwardly. Positioned immediately behind shell opening 46 is a transparent water indicator tube 47 which is upwardly inclined at approximately the same angle as the shell nose wall 15a. Supporting the tube 47 is a hollow J-shaped connector 48 which exttends from the bottom of tube 47 to the lower reservoir section 28b. Connector 48 extends into an opening 50 which is formed by an inwardly projecting reservoir flange 51. Preferably, the connector 48 is fabricated from a resilient material such as a silicone rubber which is not adversely affected by relatively high temperatures and is sufficiently pliable to afford a watertight connection between itself and reservoir flange 51. Thus, the connector 48, by means of its internal passageway 49, affords a fluid connection between the lower end of tube 47 and the bottom reservoir section 28b. To effectively indicate the fluid level in reservoir 28, it is necessary that the lower end of connector 48 disposed within the tank be at approximately the same elevation as the bottom surface of the reservoir. Projecting inwardly into the connector passageway or channel 49 is an integral protuberance or stop member 53 which slightly restricts the cross sectional area of the channel immediately below the bottom end of tube 47. The purpose of stop member 53 will be described hereinafter.

Supporting and locating the top end of the tube 47 is connector 55 which receives the upper end of tube 47 in a watertight connection. Connector 55 is also preferably formed from the same pliable silicone rubber material as is used for connector 48 and extends into the upper reservoir section 28a through an opening defined by reservoir flange 56. The fit between the connector 55 and the reservoir flange 56 is sufficiently snug to afford a watertight connection. Further, a channel 58 defined by connector 56 contains an integral protuberance or stop member 57 which is positioned immediately above the top of tube 47 and reduces the cross sectional area of the channel at this particular location. To accurately position the upper end of tube 47 with respect to tank section 28a, connector 55 has an integral wall section 59 which governs the distance between tube 47 and tank section 28a.

Included in shell nose portion 15 is an elongated escutcheon 60 positioned in nose opening 46 between portion 15 and connectors 48 and 55. The escutcheon effectively frames the portion of tube 47 which is exposed to view through opening 46. The upper end of tube 47 is held by the connector 55 being sandwiched between shell nose portion 15 and reservoir section 28a so that the location of the tube is controlled by the thickness of connector wall 59. The lower end of tube 47 is anchored by connector 48 as a consequence of being clamped between the nose portion 15 and soleplate assembly 12. The outer surface of escutcheon 60 bears indicia 61 to indicate the quantity of water remaining in tank 28. It will be realized that the indicia 61 on escutcheon 60 is orientated thereon to be read from above by the user.

To facilitate the reading of the water level in tube 47, there is positioned within the tube a spherical member 64, which is preferably made from a rubbery material having a specific gravity less than water, in order that it will float on top of the water column in tube 47. In addition, the member 64 is preferably brightly colored so that it may be readily seen. To further facilitate the reading of the water level in tube 47, a colored line 65 is fired on the glass tube 47 along the side of the tube which is remote from escutcheon 60, and the line runs lengthwise of the tube. It will be readily appreciated that stop members 53 and 57 are provided to maintain member 64 within tube 47 irrespective of the position of the iron 11.

Inasmuch as the tube 47 is generally disposed in an upward direction, is at the same general elevation as the reservoir 28 and is in fluid communication therewith, the water level in the exposed portion of tube 47 will denote the amount of water in reservoir 28. Moreover, since the tube 47 is inclined upwardly and is exposed in the extended nose portion of shell 14, the operator may readily read the water level in the tube 47 while the iron is in its normal horizontal ironing position. The tube 47 is positioned so that it may be readily viewed at the same time the user is viewing the iron controls located at the forward portion of the iron handle. That is to say, when using the iron, the user will be looking downwardly at the control members and, at the same time, the user will be able to see the water level gauge 45. In operation, the user will frequently be directing his attention to the forward or pointed end of the soleplate 13. Thus, while scanning the material being ironed, the user will also see the water level gauge 45. With this construction, it is not necessary for the iron to be upended in order to determine the amount of water remaining in reservoir 28.

While there have been shown and described a particular embodiment of the present invention, it will be apparent to those skilled in the art that various modifications may be made without departing from the invention in its broader aspects, and it is therefore aimed in the appended claims to cover all such changes and modifications as fall within the true spirit and scope of the present invention.

What is claimed as new and desired to be secured by Letters Patent of the United States is:

1. In a steam iron comprising a soleplate, an inverted cup-shaped shell having side walls secured to said soleplate, a water reservoir positioned with in said shell, said shell defining an opening in one of its side walls, a sight gauge operatively connected to said tank and positioned so that it is exposed to view through said shell opening whereby the quantity of water within said reservoir may be known when the iron is horizontally disposed in its ironing position.

2. The iron of claim 1 wherein said gauge includes a transparent tube and a first hollow connector extending between the bottom of said tube and said tank, an escutcheon member on said shell disposed adjacent to and extending parallel to said tube, said escutcheon member bearing indicia for indicating the amount of water in said reservoir.

3. The iron of claim 2 wherein said tube, escutcheon member and shell opening are orientated so that the sight gauge may be read when looking downwardly on the iron.

4. In an iron comprising an inverted cup-shaped shell with a nose portion at the front which is inclined rearwardly, an opening defined in said nose portion, a water tank positioned within said shell, a handle secured to said shell and having iron control means at the front portion thereof, a sight gauge operatively connected to said tank positioned so that is is exposed to view through said opening whereby the user may observe both said control means and sight gauge at the same time.

5. In an iron comprising an inverted cup-shaped shell being provided with a side wall having an elongated opening defined therein, a water tank having upper and lower portions positioned within said shell, a transparent tube disposed behind said shell opening and extending therewith, a first connector extending between the bottom end of said tube and the lower portion of said tank and a second connector extending between the top end of said tube and the upper portion of said tank so that said tube is in fluid communication with said tank, said connectors supporting said tube behind said shell opening whereby said tube indicates the amount of water in the tank when the iron is in a horizontal ironing position.

6. The iron of claim 5 wherein an indicating element is disposed within said tube and is sufficiently buoyant to float on water, said connectors being provided with internal protuberances which prevent said element from being displaced from within said tube.

7. The iron of claim 5 wherein a colored background is associated with the side of said tube remote from said opening whereby the water level within said tube is readily discerned.

8. The iron of claim 5 wherein said connectors are resilient and form a watertight seal between said tube and tank.

9. The iron of claim 5 wherein one of said connectors is wedged between said tank and shell to properly locate said tube.

10. A steam iron comprising a sole plate supporting an inverted cup-shaped shell having a pointed nose portion at the forward end of the iron, said shell nose portion having an inclined wall which defines an elongated opening extending upwardly, a handle secured to said shell and being provided with iron control means at the upper forward end thereof, an elongated flat water tank secured to said sole plate and extending parallel thereto, said tank defining an upper and lower aperture, a sight tube disposed inside said shell immediately behind said shell opening and inclined parallel thereto, a first resilient connector between the bottom end of said tube and said lower tank aperture and a second resilient connector between the top of said tube and the upper tank aperture so that said tube and tank are in fluid communication, said tube and control means both visible from above when the iron is in the horizontal ironing position.

11. In an iron comprising an inverted cup-shaped shell having a side wall, a water tank within said shell, sight gauge means connected to said tank to visibly indicate the amount of water therein, means exposing said gauge means through said side wall so that the amount of water within said tank is known while the iron is in the horizontal ironing position.

12. In an electric iron comprising a water tank disposed within the iron, an outside surface of the iron which is generally inclined upwardly, said surface defining an upwardly extending opening, water gauge means operatively associated with said tank for indicating the amount of water therein and being exposed by said surface opening whereby said gauge means denotes the amount of water within the tank while the iron is in the horizontal ironing position and the water within the tank is hidden except for the surface opening.

References Cited by the Examiner
UNITED STATES PATENTS

| | | | |
|---|---|---|---|
| 1,830,875 | 11/1931 | Izumiya | 38—77 |
| 2,825,986 | 3/1958 | Pavlic | 38—77 |
| 3,075,309 | 1/1963 | Seyfried et al. | 38—77 |
| 3,251,148 | 5/1966 | Knapp | 38—77 |

PATRICK D. LAWSON, *Primary Examiner.*